Jan. 6, 1970  D. S. CHISHOLM ET AL  3,487,505

LAMINATES

Filed Aug. 21, 1967

INVENTORS.
Douglas S. Chisholm
BY Walter J. Schrenk

AGENT

United States Patent Office 3,487,505
Patented Jan. 6, 1970

1

3,487,505
LAMINATES
Douglas S. Chisholm, Midland, and Walter J. Schrenk,
Bay City, Mich., assignors to The Dow Chemical Company, Midland, Mich., a corporation of Delaware
Original application Oct. 7, 1964, Ser. No. 402,118.
Divided and this application Aug. 21, 1967, Ser.
No. 662,027
Int. Cl. B29c 7/02, 7/26, 9/00
U.S. Cl. 18—13                                7 Claims

ABSTRACT OF THE DISCLOSURE

A method and apparatus are described whereby plastic film having a plurality of layers is formed by deforming a flowing stream having layers of diverse thermoplastic material to provide a sheet-like configuration having a laminar structure.

---

This application is a divisional application of our copending application Ser. No. 402,118, filed Oct. 7, 1964, now abandoned.

This invention relates to a method and apparatus for the preparation of laminates, and more particularly relates to an improved method and apparatus for the preparation of multilayer laminates from thermoplastic materials.

It is well known in the art to prepare laminates of various heat formable materials wherein the properties of the various components of the laminate contribute to the final properties of the laminated structure. Many of these laminates are prepared by forming the individual components and subsequently combining them by means of heat, pressure, adhesives and the like. Certain composite articles are formed by the coextrusion or simultaneous extrusion of two or more diverse materials. However, such techniques known to the art are not well suited for the preparation of multilayer laminates wherein more than two or three layers of material are combined in the final product. In certain coextrusion operations, particularly where thin sheets or laminated articles are prepared, there is much difficulty in obtaining a uniform composition of the product; that is, the thickness of the various lamina making up the composite article may vary, thus imparting undesired and non-uniform characteristics to the resultant product. Furthermore, the number of layers of material in conventional operations is generally limited severely by known die configurations or requires laborious layup or combination.

It is an object of this invention to provide an improved method and apparatus for the production of multilayer laminates.

A further object of this invention is to provide a method and apparatus for the extrusion of a laminate structure having a relatively large number of lamina.

A further object of the invention is to provide a method and apparatus for the extrusion of laminated structures wherein the various lamina are of generally regular thickness.

A further object of the invention is to provide a method and apparatus for the production of thin thermoplastic resinous sheet and film comprising a plurality of lamina.

It is a further object of this invention to provide an improved laminate comprising a plurality of lamina having the lamina parallel to the major surfaces of the sheet.

These benefits and other objects in accordance with the method of the present invention are readily accomplished by providing a plurality of adjacent streams of thermoplastic material in contiguous relationship to each other, altering the cross-sectional configuration of the plurality of streams by reducing the dimension of the stream perpendicular to interfaces between the individual streams and increasing the dimension in a direction transverse to the direction of flow and generally parallel to the interfaces of the streams.

The method of the present invention is particularly adapted to employ the apparatus of the invention which comprises in cooperative combination a housing defining at least a cavity adapted to receive first and second heat plastified thermoplastic streams, means to distribute the streams into a plurality of smaller streams, the smaller streams being in generally alternate arrangement with smaller streams from the first stream, being in alternating arrangement with the smaller streams from the second stream, the housing defining a passageway, the passageway having an entrance and an exit, the entrance having a first axis and a second axis, the exit having a first axis and a second axis, the first axes of the entrance and the exit being coplanar and the second axes of the entrance and the exit being coplanar, the first and second axes of the entrance and the exit being disposed generally normal to each other, the first axis of the entrance being the major axis and the second axis the minor axis, the first axis of the exit being the minor axis and the second axis of the exit being the major axis, the passageway being so constructed and arranged so as to permit streamline flow of a fluid therein and the length of the first axis of the major entrance being substantially greater than that of the first axis of the exit.

These features and other benefits and advantages in accordance with the present invention will become more apparent from the following specification when taken in connection with the drawing wherein.

Figure 1:
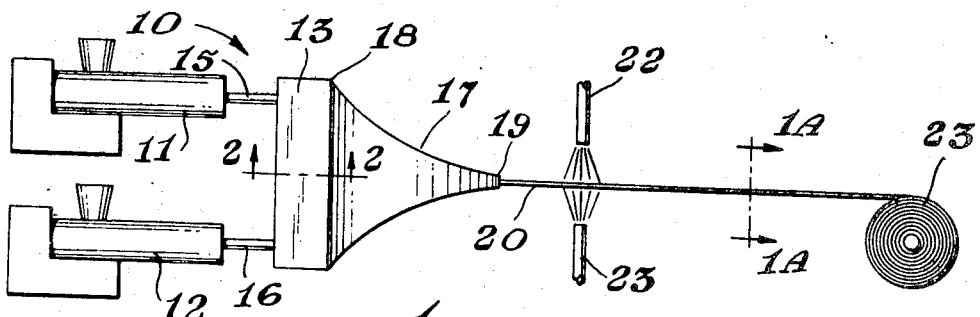
FIGURE 1 is a schematic representation of a simplified apparatus in accordance with the invention showing an enlarged section of the product thereof.

In FIGURE 1 there is illustrated an apparatus in accordance with the invention generally designated by the reference numeral 10. The apparatus comprises in cooperative combination a first extruder 11, a second extruder 12, a distribution manifold 13, in full communication with the extruder 11 by means of the conduit 15 and in communication with the extruder 12 by means of the conduit 16. A transition piece 17 having an inlet or first opening 18 and a second or outlet opening 19 is in communication with the discharge of the manifold 13. A laminated film 20 issues from the discharge opening 19. Adjacent the opening 19 are cooling means 23 which reduce the temperature of the laminate film or sheet 20 to a temperature below the thermoplastic temperature thereof. The film or sheet 20 is wound onto a takeup means or roll 23. An enlarged portion 20a of the film 20 is shown depicting a plurality of lamina 25 and 26 of material from the extruders 11 and 12, respectively.

Figure 2:
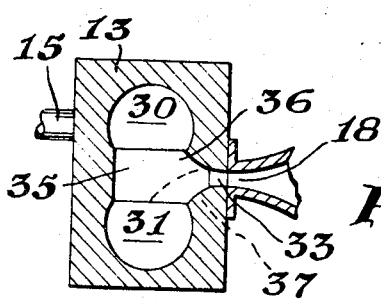
FIGURE 2 is a sectional view through a distribution manifold of the apparatus of FIGURE 1.
Figure 1A:
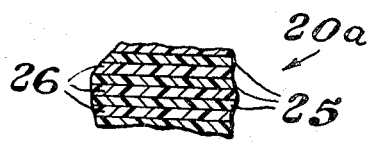
FIGURE 1A is a section taken on line 1A—1A of FIG. 1.

In FIGURE 2 there is illustrated a sectional view of the manifold 13. The manifold 13 comprises a first major passageway 30 in communication with the conduit 15, a second major passageway 31 in communication with the conduit 16 (not shown), an extrusion slot or orifice 33, and a distribution block 35. The distribution block 35 defines a plurality of passageways 36 and a plurality of passageways 37. The passageways 36 provide communication between the first major passageway 30 and the extrusion orifice 33. The passageways 37 provide communication between the second major passageway 31 and the extrusion orifice 33. The passageways 36 and 37 are so constructed and arranged that they alternate in the distribution block and provide interdigitated streams of the material flowing from the first and second major passageways 31 to the extrusion orifice 33.

Figure 3:
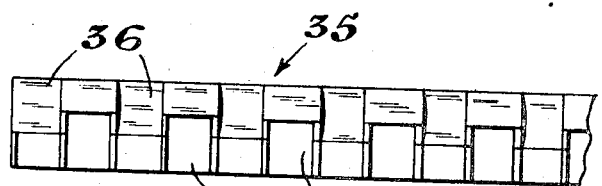
FIGURE 3 shows a view of a distribution block employed in the manifold.

In FIGURE 3 a front partial view of the distribution block 35 is shown illustrating the relationship between the passageways or channels 36 and 37 illustrating the interdigitated discharge of the thermoplastic materials.

Figure 4:
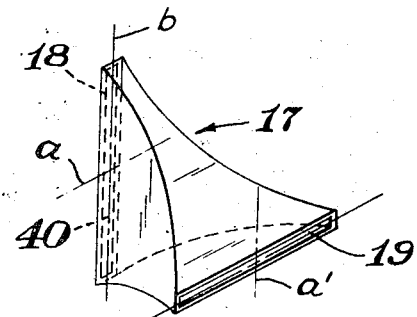
FIGURE 4 is a schematic isometric representation of a transition piece as utilized in the apparatus of FIGURE 1.

In FIGURE 4 there is illustrated an isometric representation of a transition piece 17 having an inlet opening 18 and an outlet opening 19. A passageway 40 provides full communication between the inlet and outlet opening and permits streamline flow of a liquid from the opening 18 to the opening 19 without rotation of the flow lamina. The inlet opening 18 has a first or major axis $a$ and a second or minor axis $b$. The outlet opening 19 has a first axis $a'$ and a second axis $b'$. The axes $a$ and $a'$ are generally coplanar and the axes $b$ and $b'$ are generally coplanar. The transition piece of FIGURE 4 is an exponential transition piece of constant cross-sectional area wherein its length is arbitrarily selected and the central portion has a square cross-section having a length $l$, $b$ and $h$ which are the desired width and height of one of the openings. The equation of the outline of the transition section such as is seen in FIGURE 1 if a z axis is assumed to run vertically is $$z = \frac{\sqrt{bh}}{2}\left(\frac{h}{b}\right)^{x/l}$$

The equation for a line drawn centrally through the conduit and corresponding to the outline in a plane 90° to the observed plane of FIGURE 1 is:

$$y = \frac{\sqrt{bh}}{2}\left(\frac{h}{b}\right)^{x/l}$$

Figure 5:
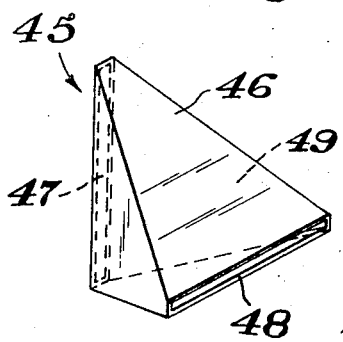
FIGURE 5 is an alternate configuration of a transition piece.

The exponential transition section is particuarly advantageous and beneficial if uniform flow rate within the transition piece is to be maintained. For many purposes, a transition piece such as is illustrated in FIGURE 5 is adequate. A transition piece of FIGURE 5 generally designated by the reference numeral 45 comprises a housing 46 defining an inlet passage 47, an outlet passage 48 and an internal interconnecting channel 49 so constructed and arranged so as to permit substantially streamlined flow of material entering the passageway 47 and being discharged from the opening 48.

Figure 6:
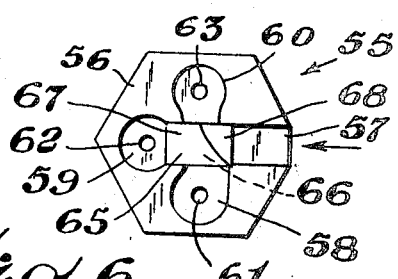
FIGURE 6 is an alternate embodiment of a manifold.

In FIGURE 6 there is illustrated an alternate configuration of a manifold generally designated by the reference numeral 55. The manifold 55 comprises a housing or body 56 having defined therein an extrusion orifice 57, first, second and third major passageways 58, 59 and 60, respectively, which are in communication with thermoplastic material supply conduits 61, 62 and 63, respectively. A distribution block 65 is disposed within the body 56 and defines a plurality of passageways 66 providing communication between the first major passageway 58 and the extrusion aperture 57, a plurality of passageways 67 providing communication between the major passageway 59 and the extrusion opening 57, a plurality of passageways 68 providing communication between the third major passageway 60 and the extrusion orifice 67. The passageways 66, 67 and 68 are alternately arranged in the distribution block 65.

Figure 7:
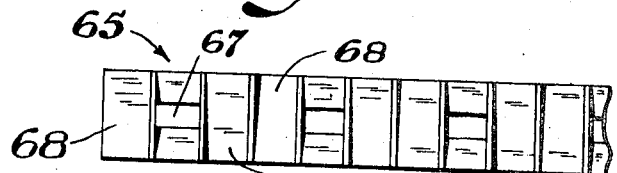
FIGURE 7 is a view of a portion of a feed port block for use in the manifold of FIGURE 6.

In FIGURE 7 a front view of a portion of the distribution block 65 is shown depicting the relationship between the passageways 66, 67 and 68. Each of the passageways terminate in an opening substantially commensurate with the width of the extrusion passage 57. The embodiment of FIGURE 6 is particularly advantageous when it is desired to prepare a laminate having three components and a plurality of layers.

In operation of the apparatus in accordance with the present invention, thermoplastic resinous material in a heat plastified condition is extruded from the extruders 11 and 12, passed into the manifold 13 to the passageways 30 and 31, respectively. The heat plastified material from the passageway 30 flows to the extrusion orifice 33 by way of passageways 36. The material from the extruder 12 flows into the passageway 31 and is discharged into the passageway 33 in interdigitating relationship with the material from the extruder 11. Thus, a striped sheet or stream is formed wherein the diverse materials extend from one major surface to the opposite major surface. On passing into the transition section, the extruded sheet in effect is squeezed or reduced (in width) and expanded in a direction corresponding to its thickness until on emerging from the outlet the portion of the sheet originally representing the edge is now a major surface or the width and that which had heretofore been the thickness of the sheet is now the width. As the transition piece permits linear or streamline flow, the various components are repositioned in such a manner that a number of thin layers of material in the form of a composite sheet are obtained without the necessity of employing a plurality of slot dies. The relative thickness of the various layers is readily controlled by varying the quantity of material provided to the manifold by the extruders. Thus, it is possible to have the various materials present in the desired proportion. Due to the relatively large size of the various feed ports defined in the distribution block, control of the thickness of the various layers is readily accomplished without the necessity of maintaining the extremely high dimensional tolerances that are necessary when conventional film and sheeting dies are utilized to prepare laminates. The embodiment of FIGURES 6 and 7 are readily utilized by employing the required number of streams of thermoplastic resinous material to provide the desired laminate.

Employing an apparatus generally similar to the apparatus 10 of FIGURE 1, equal quantities of polystyrene and polymethyl methacrylate are extruded at a rate of about 15 pounds per hour into a sheet about 4 inches in width and about ⅛ inch in thickness. The sheet consists of 125 layers alternately of polystyrene and polymethyl methacrylate. On microscopic examination, the layers are determined to be substantially parallel to the surfaces of the sheet and of uniform thickness. The resultant sheet is more flexible and has higher impact resistance than a like sheet of polystyrene or polymethyl methacrylate.

The foregoing example is repeated employing polystyrene in combination with a green tinted nylon. Similar results are obtained. Beneficial laminates are also prepared in accordance with the invention employing polypropylene-polyvinyl chloride, polypropylene-polystyrene, ethyl cellulose-polystyrene, polyethylene-polystyrene, polypropylene-polyethylene, polyvinyl chloride-saran (copolymer of vinyl chloride and vinylidene chloride), etc. As is evident, the relative thicknesses of the like material are proportional to the amount of material issuing from the appropriate passageway or feed port in the die. Thus, by varying the dimensions of the feed ports, heavier or thicker layers may be employed at desired locations within the film.

As is apparent from the foregoing specification, the method and apparatus of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A housing defining at least one cavity therein and adapted to receive at least a first and second heat plastified thermoplastic stream, means to distribute the streams into a plurality of smaller streams, the smaller streams being in generally alternate arrangement with smaller streams from the first stream, being in alternating arrangement with the smaller streams from the second stream, the housing defining a passageway, the passageway having an entrance and an exit, the entrance having a first axis and a second axis, the exit having a first axis and a second axis, the first axes of the entrance and the exit being coplanar and the second axes of the entrance and the exit being coplanar, the first and second axes of the entrance and the exit being disposed generally normal to each other, the first axis of the entrance being the major axis and the second axis the minor axis, the first axis of the exit being the minor axis and the second axis of the exit being the major axis, the passageway being so constructed and arranged so as to permit streamline flow of a fluid therein and the length of the first axis of the major entrance being substantially greater than that of the first axis of the exit.

2. The apparatus of claim 1 wherein the means to provide a plurality of streams comprises a housing having defined therein a first passageway and a second passageway, the first passageway so constructed and arranged so as to receive a first thermoplastic stream, the second passageway so constructed and arranged so as to be adapted to receive a second thermoplastic stream, the housing defining an exit aperture and a plurality of minor passageways selectively providing communication between the first passageway and the extrusion orifice and the second passageway and the extrusion orifice, the minor passageways being disposed in generally side by side arrangement.

3. In an apparatus for the preparation of a sheet of thermoplastic resinous material, the sheet having layers of diverse thermoplastic material, the apparatus comprising in cooperative combination a first means to supply a heat plastified thermoplastic stream,
a second means to supply a heat plastified resinous stream,
a distribution manifold, the distribution manifold defining
a first major passageway and a second major passageway adapted to receive first and second heat plastified streams, respectively, the manifold defining
an extrusion slot,
a plurality of passageways, each of the passageways communicating with one of the major passageways,
a stream shaping means disposed adjacent the extrusion slot, the stream shaping means defining
a stream shaping passageway and
a terminal extrusion slot, the extrusion slot and the terminal extrusion slot being disposed generally in planes normal to each other, the stream shaping means thereby deforming a stream issuing from the extrusion slot to provide a sheet having interfaces between the first and second synthetic resinous materials generally parallel to the face of the sheet.

4. The apparatus of claim 3 wherein a third major passageway is provided within the housing and discharged into the extrusion slot to provide a composite stream having diverse synthetic resinous materials in interdigitating relationship.

5. The apparatus of claim 3 wherein the distribution manifold includes a distribution block having a plurality of channels therein, the channels being in communication with the extrusion slot and in selective communication with one of the major passageways.

6. The apparatus of claim 3 wherein the stream shaping means permits streamline flow of a liquid from the extrusion slot to the terminal extrusion slot.

7. The apparatus of claim 3 wherein the extrusion slot and the terminal extrusion slot each have cross-sectional configurations disposed substantially at right angles to each other.

References Cited

UNITED STATES PATENTS

| | | |
|---|---|---|
| 1,603,813 | 10/1926 | Stein. |
| 2,572,677 | 10/1957 | Tench. |
| 3,070,841 | 1/1963 | Schornstheimer. |
| 3,295,467 | 1/1967 | Grofen. |
| 3,295,466 | 1/1967 | Bell et al. |
| 3,397,428 | 8/1968 | Donald. |

WILLIAM J. STEPHENSON, Primary Examiner